(12) United States Patent
Ashley

(10) Patent No.: US 7,303,320 B1
(45) Date of Patent: Dec. 4, 2007

(54) PICK-UP TRUCK CAB ACCESSORY MOUNTING BRACKET

(76) Inventor: David M. Ashley, 375 S. "G" St., San Bernardino, CA (US) 92410

( * ) Notice: Subject to any disclaimer, the term of this patent is extended or adjusted under 35 U.S.C. 154(b) by 0 days.

(21) Appl. No.: 11/294,879

(22) Filed: Dec. 7, 2005

(51) Int. Cl.
*B60Q 1/00* (2006.01)
*B60Q 1/26* (2006.01)
*B60Q 11/00* (2006.01)

(52) U.S. Cl. ............ 362/493; 362/477; 362/485; 362/497; 362/498; 362/549; 340/425.5; 340/815.4; 248/121

(58) Field of Classification Search ............ 362/477, 362/479, 487, 485, 493, 549, 395, 457, 458, 362/496–498, 484, 488, 503, 541; 340/425.5, 340/815.4, 479; 248/121
See application file for complete search history.

(56) References Cited

U.S. PATENT DOCUMENTS

| D253,170 | S | * | 10/1979 | Ramirez | D12/412 |
|---|---|---|---|---|---|
| 4,688,845 | A | * | 8/1987 | Kingsley | 296/99.1 |
| 4,692,845 | A | * | 9/1987 | Widhalm et al. | 362/485 |
| D295,084 | S | * | 4/1988 | Weber | D26/35 |
| 5,183,307 | A | * | 2/1993 | Chiu, Jr. | 296/37.6 |
| 5,258,893 | A | * | 11/1993 | Finneyfrock | 362/485 |
| 5,450,296 | A | * | 9/1995 | McHugh | 362/525 |
| 6,126,229 | A | * | 10/2000 | Lund | 296/180.1 |
| 6,244,736 | B1 | * | 6/2001 | O'Neal | 362/549 |
| 6,773,151 | B2 | * | 8/2004 | Brown | 362/519 |
| 2001/0053082 | A1 | * | 12/2001 | Chipalkatti et al. | 362/496 |
| 2003/0011180 | A1 | * | 1/2003 | Coffman et al. | 280/748 |
| 2003/0035300 | A1 | * | 2/2003 | Branstetter | 362/549 |

* cited by examiner

*Primary Examiner*—Nimeshkumar D. Patel
*Assistant Examiner*—William Tso
(74) *Attorney, Agent, or Firm*—Albert O. Cota

(57) ABSTRACT

A bracket (10) for mounting accessories on a pick-up truck cab (20) consisting of a Z-shaped elongated body (22) having a forward upper horizontal mounting flange (24), a rearward lower horizontal mounting flange (28), and an integral arcuate upright section (26) located in between. The upright section (26) conforms to the shape of the truck cab (20) and includes a recessed cavity (30) in reverse image of a truck third brake light socket (32) that is formed within the truck cab. A number of threaded fasteners (54) are used for attaching the third brake light onto existing threaded mounting holes (38) in the truck third brake light socket (32) when the bracket is inserted into the socket (32), thereby securely retaining both the light and the bracket in place.

17 Claims, 5 Drawing Sheets

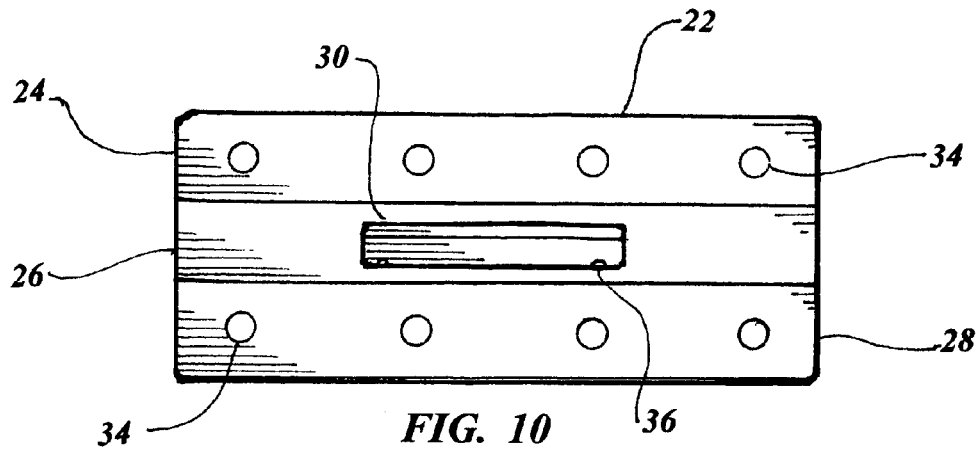
FIG. 10
FIG. 11  FIG. 12  FIG. 13
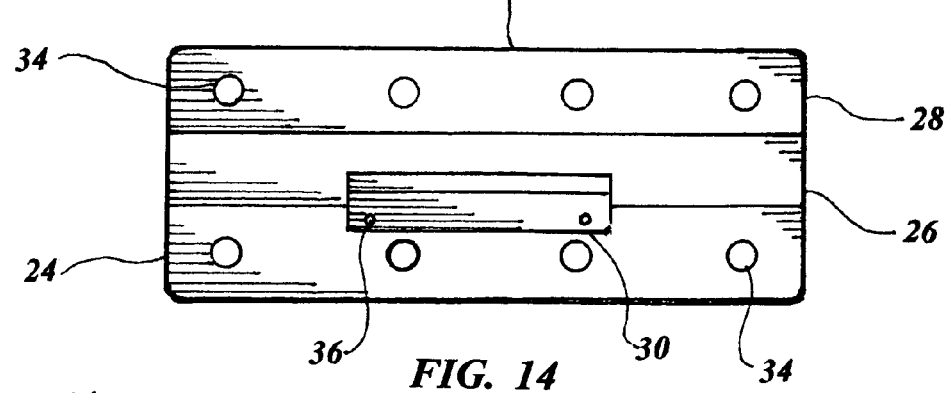
FIG. 14
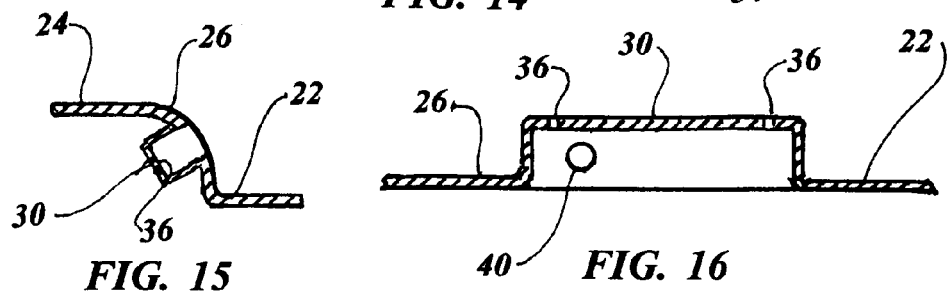
FIG. 15  FIG. 16

PICK-UP TRUCK CAB ACCESSORY MOUNTING BRACKET

TECHNICAL FIELD

The invention generally pertains to mounting brackets, and more specifically to a bracket for mounting accessories such as lights, speakers, antennas etc. on the cab of a pick-up truck with the bracket attached to the vehicle requiring additional holes.

BACKGROUND ART

Previously, many types of brackets or light bars have been used to provide an effective means for mounting lights and other accessories on top of a pick-up truck and other vehicles.

The prior art listed below did not disclose any patents that possess the novelty of the instant invention, however the following U.S. patents are considered related:

| U.S. Pat. No. | Inventor | Issue Date |
|---|---|---|
| 4,722,030 | Bowden | Jan. 26, 1988 |
| 4,974,125 | McGehee | Nov. 27, 1990 |
| 5,585,782 | Yosko | Dec. 17, 1966 |
| 5,988,839 | Pokorney et al. | Nov. 23, 1999 |
| 6,424,269 B1 | Pederson | Jul. 23, 2002 |

Bowden in U.S. Pat. No. 4,722,030 teaches a light bar for a vehicle consisting of a support that extends transversely across the top of a vehicle. One or more lights are mounted on the support, and by manipulation of controls the driver of the vehicle is able to aim the lights.

U.S. Pat. No. 4,974,125 issued to McGehee is for a light bar that contains a series of aligned and illuminated geometric configurations, which enhance visibility of the vehicles. Spaced flanges located beneath the bar permit mounting mud flaps, and access plates permit service lights and the like to be contained on the bar.

Yosko in U.S. Pat. No. 5,585,782 discloses a light bar that includes optical fibers facing a light source backed by a reflective surface.

Pokorney et al. in U.S. Pat. No. 5,988,839 teaches a rear-facing light bar for a passenger vehicle. The light bar has a housing that is shaped to define a rearward-directed roof extension, which increases in depth in the downstream direction. The housing is permanently attached to the vehicle and supports a linear array of individually controllable lights, which are located behind an outer lens and are rearward directed.

U.S. Pat. No. 6,424,269 B1 issued to Pederson for LED warning signal lights and a light bar. The warning signal lights have a controller, power supply and battery. Various colored light signals such as stationary, revolving or oscillating lights are included. The warning light may be mounted on a vehicle or mounted on a tripod as a stand-alone warning signal.

For background purposes and as indicative of the art to which the invention is related, reference may be made to the remaining cited patents Des. 310,793 issued to Castagna and Des. 347,902 issued to Stutts.

DISCLOSURE OF THE INVENTION

Light bars or brackets to mount lights on top of a motor vehicle have been popular for decades, particularly with off-road and emergency vehicles. Some prior art light bars are dedicated to a particular utility and as such as those that have the lights and signals already included as an integral part of the attaching bracket. In many cases, the vehicle itself must be modified by drilling holes to mount a light bar, or in some instances a rain rail located on the sides of the vehicle are used to clamp the bar. In either case, some damage to the interface often occurs leaving marks or holes that must be sealed.

Therefore, the primary object of the invention is to eliminate the need to add holes to a truck cab to accommodate accessories such as lights or other apparatus. The invention utilizes the reinforced portion of a pick-up truck cab's roof that houses the third brake light, which is mandated by the U.S. government for all trucks and light utility vehicles. The bracket of the instant invention is configured to fit into the third brake light socket, which is provided by the original equipment manufacturer and is located on the trailing edge of the truck cab in later model pick-up trucks.

An important object of the invention utilizes the strength of the reinforced third brake light socket, since most manufacturer's require building-up the sheet metal with reinforcement and extra material to provide a socket that does not affect the structural integrity of the cab's sheet metal construction. Furthermore, only the threaded fasteners that hold the third brake light are required to mount the inventive bracket and the accessories, since the brake light is replaced in a recessed cavity of the bracket. While in some instances the original screws may be used if they are long enough others require longer threaded fasteners. The fasteners only provide retention forces, as the fit between the bracket and the truck socket is sufficiently tight in order to provide strength in lateral and vertical directions. The invention fits snugly for mounting, as each bracket is necessarily manufactured to fit an exact model of pick-up truck and fits tightly into the existing third-light opening.

Still another object of the invention is the ability of the inventive bracket to be easily removed with no marks or holes that mar the surface or integrity of a vehicle's finish. This is accomplished by utilizing a gasket which is permanently mounted onto the back side of the bracket and when removed no marks remain. Further, the gasket is of the closed cell type which prevents the accumulation of rain water between the bracket and the cab which can have harmful effects on the finish.

Yet another object of the invention is the fact that the inventive bracket has an aesthetic appearance, which results from the bracket being robust and stout looking, with a smooth outline that follows the contours of the pick-up body design. When the bracket's accessories are attached, the overall effect on the vehicle's appearance is enhanced and gives the impression of a solid, durable customized vehicle.

A further object of the invention is its adaptability to accommodate most typical accessories used on the roof of a pick-up truck. Almost any type of accessory can be used with the bracket such as, but not limited to driving lights, off-road lights, fog lights, strobe lights, cargo-loading lights, LED accent lights, turn signal lights, backup lights, blinking caution lights, audio speakers, antennas, emergency vehicle lights and others.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 10 is a top view of the bracket body in the preferred embodiment, completely removed from the invention for clarity.

FIG. 11 is a left side view of the bracket body in the preferred embodiment, completely removed from the invention for clarity.

FIG. 12 is a front view of the bracket body in the preferred embodiment, completely removed from the invention for clarity.

FIG. 13 is a right side view of the bracket body in the preferred embodiment, completely removed from the invention for clarity.

FIG. 14 is a bottom view of the bracket body in the preferred embodiment completely removed from the invention for clarity.

FIG. 15 is a cross-sectional view taken along lines 15-15 of FIG. 12.

FIG. 16 is a cross-sectional view taken along lines 16-16 of FIG. 12.

BEST MODE FOR CARRYING OUT THE INVENTION

Figure 1:
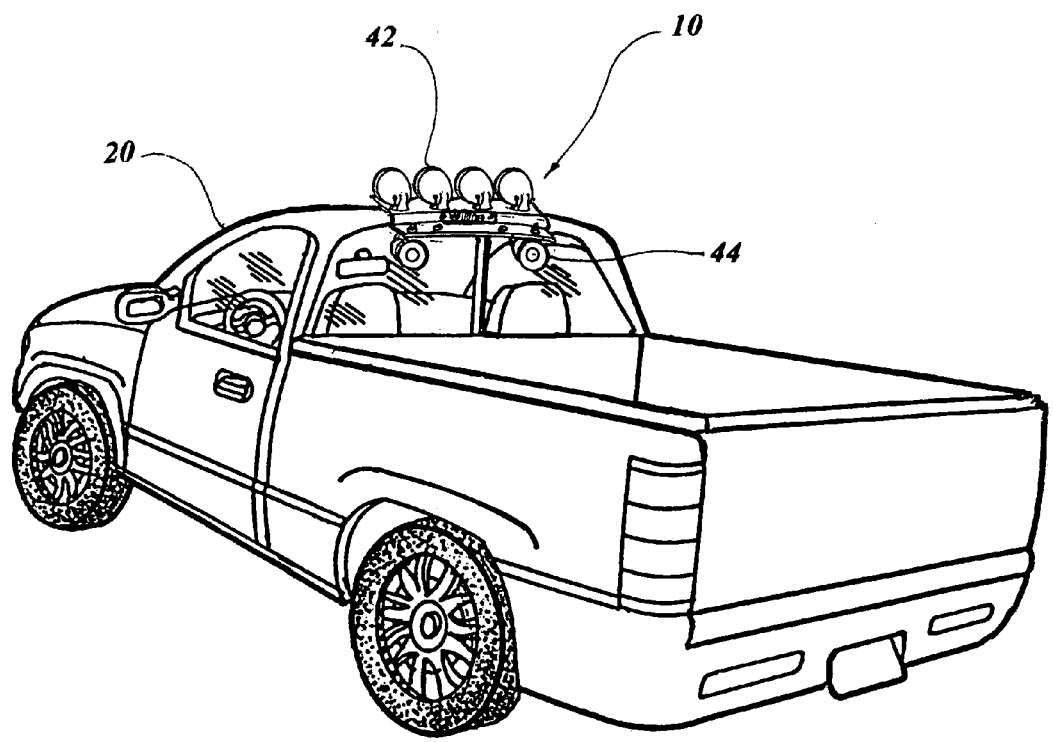
FIG. 1 is a partial isometric view of the bracket installed on a pick-up truck for mounting accessories on the truck cab in the preferred embodiment.

The best mode for carrying out the invention is presented in terms of a preferred embodiment for a pick-up truck cab accessory mounting bracket 10, or as also referred to as a light bar, which permits accessories to be mounted on a pick-up truck cab 20. The preferred embodiment of the bracket 10, as shown in FIGS. 1 through 16, is comprised of a unitary Z-shaped elongated body 22 that is configured to include an integral, forward, upper horizontal mounting flange 24; an integral, arcuate, upright section 26; and an integral, rearward, lower horizontal mounting flange 28. The integral, arcuate, upright section 26 conforms to the shape of the truck cab 20, as shown in cross-section of FIG. 5, with the arcuate section 26 having an indented recessed cavity 30 in reverse image of a third brake light socket 32 that is originally formed within the truck cab 20. The elongated body 22 is shown in detail in FIGS. 10-16.

The bracket 10 preferably has a length of essentially two-thirds the width of the truck cab 20, with the upper horizontal mounting flange 24 and lower horizontal mounting flanges 28, having the approximate width of an accessory such as an off-road light or a cargo illuminating light. Preferably, the unitary Z-shaped elongated body 22 of the bracket 10 is formed of metal such as anodized or painted cast aluminum. It should be noted however, that sheet metal formed by deep drawing and angular bending may be an acceptable substitute in either aluminum or steel.

Figure 5:
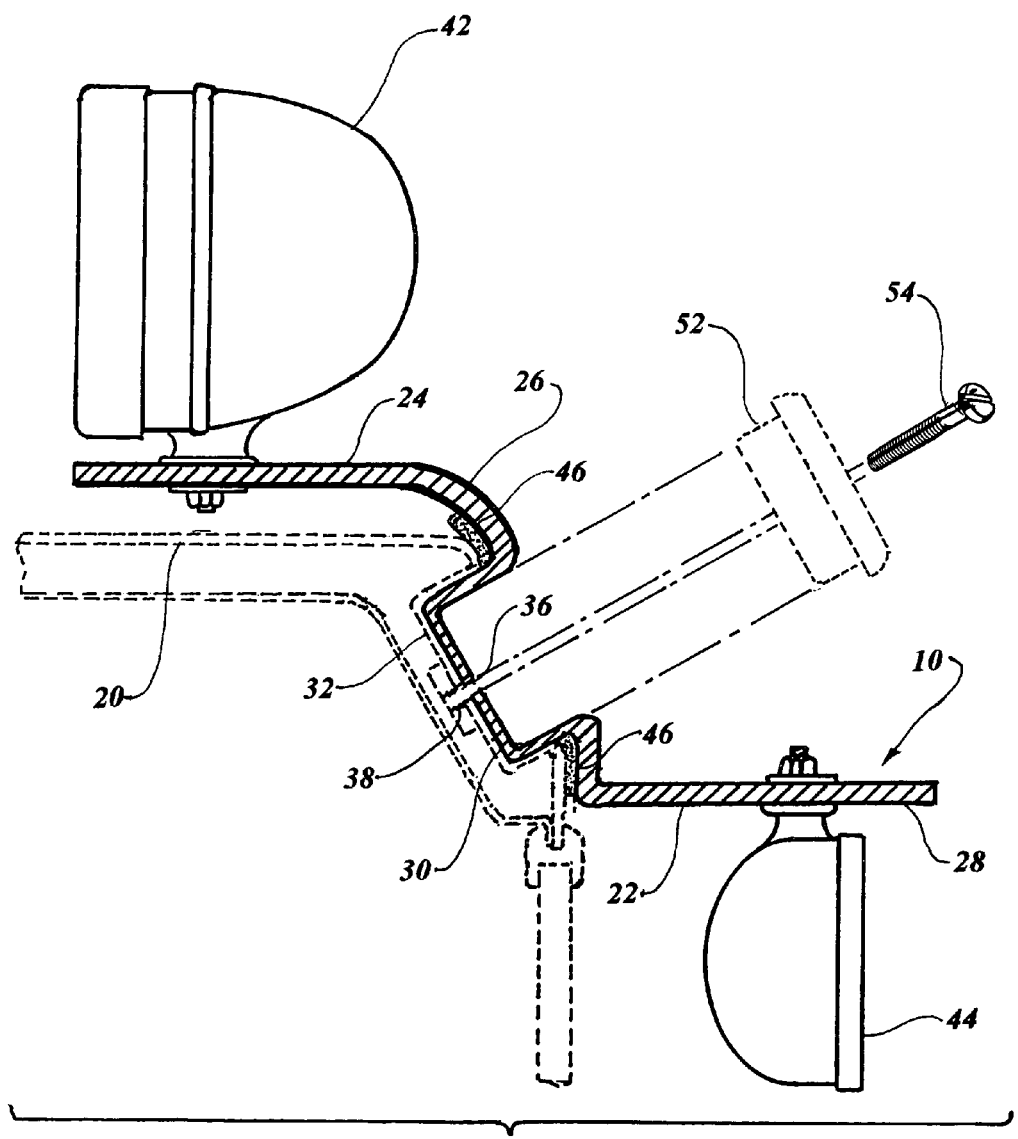
FIG. 5 is an enlarged cross-sectional view taken along lines 5-5 of FIG. 4.

The forward upper horizontal mounting flange 24 is sufficiently spaced above the truck cab 20 to clear accessory attaching fasteners, as shown in FIG. 5. The flange 24 includes a plurality of accessory clearance openings 34 that are compatible in size with common accessory mounting attachments. While round holes are shown in FIGS. 6, 7, 10 and 14, slots or openings in any compatible shape may be used with equal ease according to the type and style of attachment. The upper horizontal mounting flange 24 has a thickness ranging from 0.19 to 0.31 inches (0.48 to 0.79 cm) in the preferred embodiment.

Figure 2:
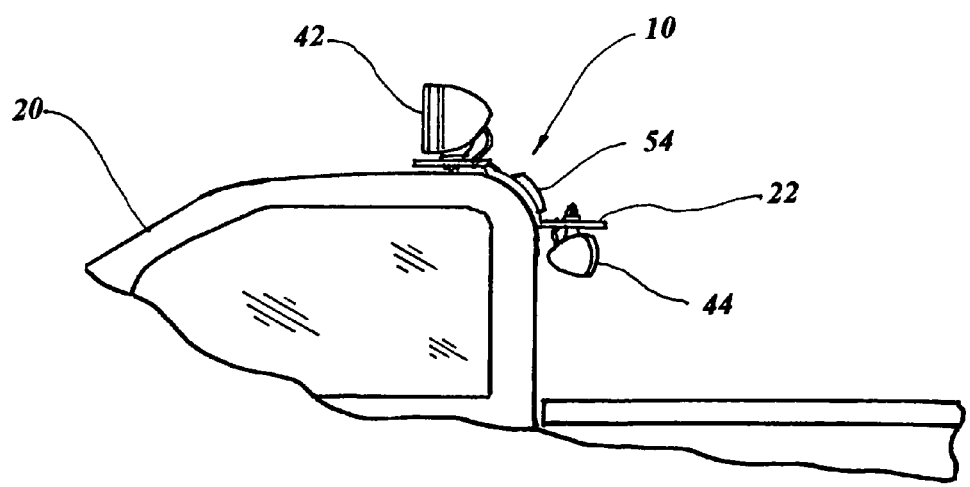
FIG. 2 is a road side view of the installed accessory mounting bracket with the pick-up truck cut away for clarity.

The arcuate upright section 26 is curved vertically and horizontally to mate in mirror image of the truck cab's 20 external surfaces, with the vertical curvature shown in FIGS. 2 and 5. FIG. 1 shows the horizontal curve of the entire bracket 10. A plurality of clearance holes 36, which are located in the recessed cavity 30, are in direct alignment with existing mounting threaded holes 38 in the pick-up truck cab's third brake light socket 32 that are used for the original third brake light fasteners. The arcuate upright section 26 also includes a bore 40 for a grommet in the recessed cavity 30, with the clearance holes 36 for the original third brake light fasteners and the grommet bore 40 for the grommet shown if FIG. 16.

The rearward lower horizontal mounting flange 28 includes a plurality of accessory clearance openings 34 that are also compatible in size with accessory mounting attachments as described above. The rearward lower horizontal mounting flange 28 has a thickness from 0.19 to 0.31 inches (0.48 to 0.79 cm) in the cast aluminum construction.

A gasket 46 is adhered to a forward portion of the arcuate upright section 26 of the bracket body 22 that surrounds an outer surface of the indented recessed cavity 30. The gasket 46 may be of any suitable material, with a closed cell neoprene sponge having a pressure-sensitive adhesive backing is preferred. The gasket 46 precludes damaging the truck cab 20 around the third brake light socket 32 and keeps the interface between the bracket 10 and the cab 20 clean, thereby preventing water from being retained within the contiguous surfaces. The gasket 46 also prohibits any electrolysis caused by dissimilar metal contact if unlike materials are used in the bracket's 10 construction.

Figure 6:
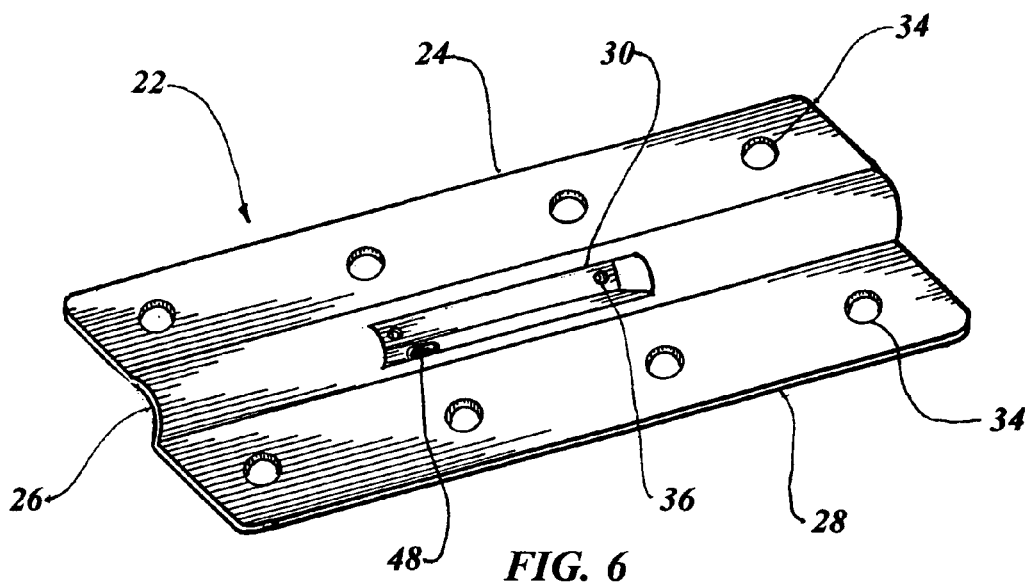
FIG. 6 is a partial isometric front view of the bracket body in the preferred embodiment, completely removed from the invention for clarity.
Figure 7:
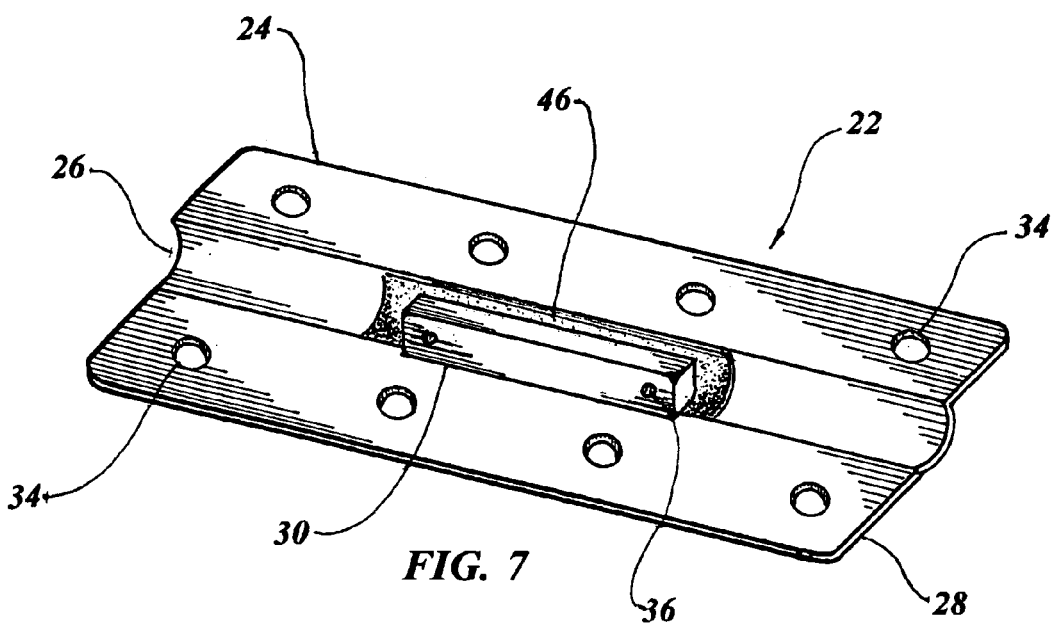
FIG. 7 is a partial isometric rear view of the bracket body with the gasket installed in the preferred embodiment, completely removed from the invention for clarity.
Figure 8:
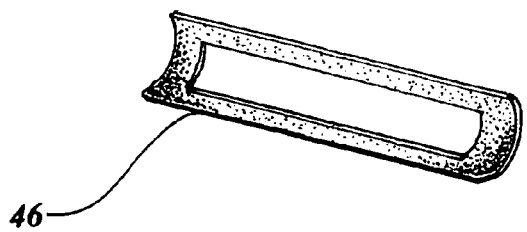
FIG. 8 is a partial isometric view of the gasket in the preferred embodiment, completely removed from the invention for clarity.
Figure 9:
FIG. 9 is a partial isometric view of the grommet in the preferred embodiment, completely removed from the invention for clarity.

A resilient grommet 48 is positioned within the grommet bore 40 of the bracket body indented recessed cavity 30 to protect the electrical wiring 50 of the third brake light 52, as shown in FIGS. 6 and 9. The location of the grommet bore 40 may vary as to the clearance allowed in third brake light socket 32 and the make of the truck, since there are many and varied configurations in today's market.

A plurality of threaded fasteners 54 are used in conjunction with the bracket body 22 to complete the bracket 10 to the cab 20. The threaded fasteners 54 have sufficient length for attaching both the bracket body 22 and a third brake light 52 using the existing holes 38 within the truck cab's third brake light socket 32. In some truck models the OEM fasteners may be long enough, however, certain fasteners may be too short and require replacement. Obviously, the threads of the fasteners 54 must have the same configuration as the existing threaded mounting holes 38 in the truck's socket 32.

The bracket 10 is configured to mount a plurality of utility accessories such as driving lights, off-road lights, fog lights, strobe lights, cargo loading lights, LED accent lights, turn signal lights, backup lights, blinking caution lights, audio speakers, antennas or emergency vehicle lights. Off-road lights 42 and cargo loading lights 44 are shown in FIGS. 1, 2, 4 and 5, however, various types of accessories in any combination may be used for mounting on the bracket 10.

Figure 3:
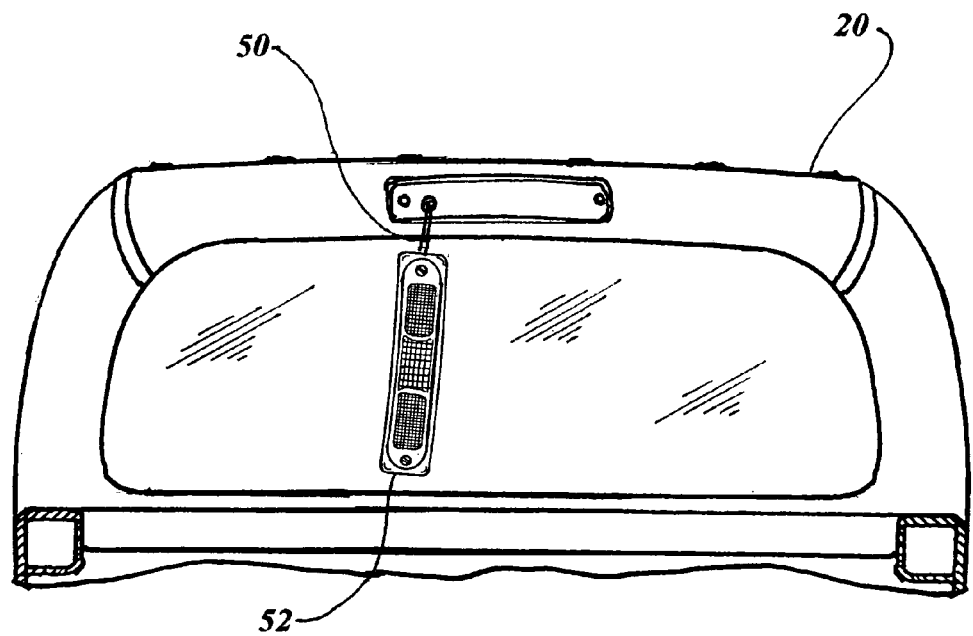
FIG. 3 is a cutaway view of the pick-up truck looking from the rear illustrating the cab with the truck's third brake light removed from the cab socket but still electrically attached.
Figure 4:
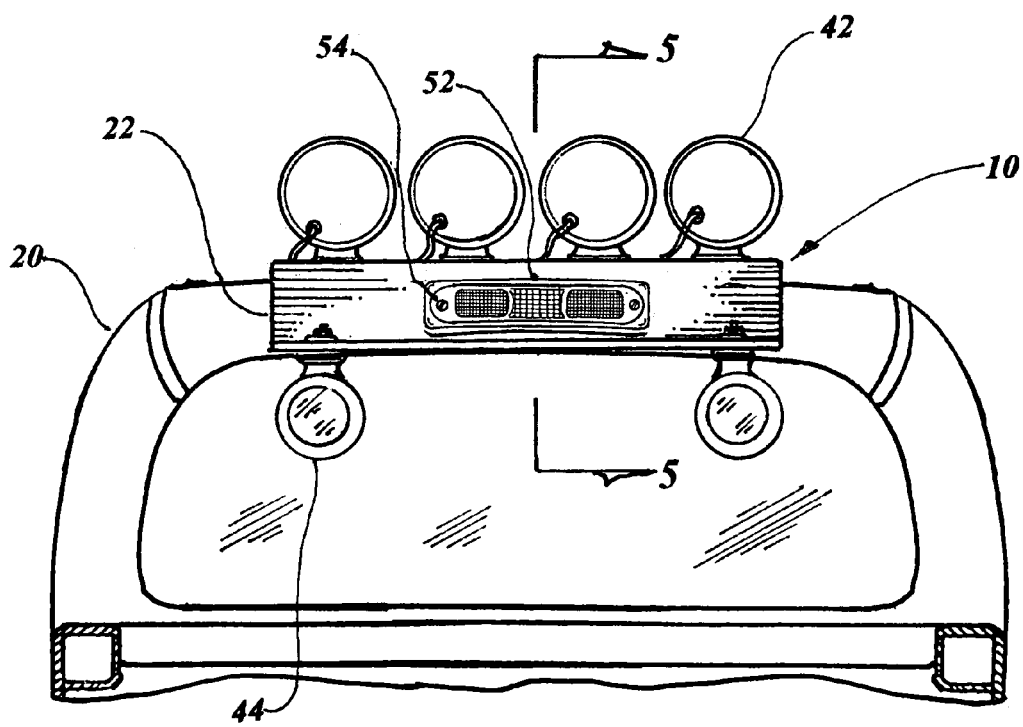
FIG. 4 is a cutaway view of the pick-up truck looking from the rear illustrating the cab with the bracket containing accessory lights installed along with the third brake light which holds the bracket in place.

The accessory mounting bracket 10 is attached to a pick-up truck cab 20 using the following preferred method which includes the steps of:

partially removing the third brake light 52 from the pick-up truck cab 20 in order to expose the integral third brake light socket 32, as shown in FIG. 3, disconnecting electrical wiring 50 from the third brake light 52 shown in FIG. 3 to complete removal of the light 52, installing the bracket 10 that incorporates the unitary Z-shaped elongated body 22 including the indented recessed cavity 30 and grommet 48 into the cab's third brake light socket 32, with the bracket 10 fitting snugly between the cavity 30 and the socket 32, connecting the electrical wiring 50 from the truck cab 20 to the third brake light 52, placing the pick-up truck third brake light 52 into the indented recessed cavity 30 of the bracket 10, installing a plurality of threaded fasteners 54 having a length sufficient to attach both the bracket 10 and the third brake light 52 using existing holes 38 within the truck cab's third brake light socket 32, tightening the threaded fasteners 54 until both the third brake light 52 and the bracket 10 are secure, and installing accessories onto the bracket body 10.

It should be realized that the accessories, which are not part of the invention, may be installed first prior to partially removing the third brake light 52 from the cab of the pick-up truck 20 if it is more convenient to the installer and the accessories are light enough to be handled easily.

While the drawings depict the basic design and number of fasteners 54 for mounting the third brake light 52 for the General Motors type of pick-up truck, it should be realized that each truck manufacturer may have a different configuration. Since the fit and interface is critical, each bracket 10 for a specific make and model will require a different compatible configuration but will have the same basic elements and will be therefore applicable to the invention.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A bracket adapted to mount accessories on a pick-up truck cab having a third brake light socket comprising:
   a) a Z-shaped elongated body having a forward upper mounting flange, a rearward lower mounting flange and an upright section therebetween, with the upright section conforming to the shape of the truck cab and the upright section having a recessed cavity complementing the third brake light socket that is formed within the truck cab, and
   b) a plurality of threaded fasteners for attaching a third brake light jointly onto the bracket elongated body and the bracket when both are inserted into the third brake light socket.

2. A bracket adapted to mount accessories on a pick-up truck cab having a third brake light socket which comprises:
   a) a unitary Z-shaped elongated body having:
      (1) an integral, forward, upper horizontal mounting flange,
      (2) an integral, arcuate upright section conforming to the shape of the truck cab, with the arcuate section having a recessed cavity therein complementing the third brake light socket formed within the truck cab, and
      (3) an integral, rearward lower horizontal mounting flange,
   b) a resilient grommet positioned within the bracket body recessed cavity,
   c) a gasket adhered to a forward portion of the upright section of the bracket body that surrounds an outer surface of the indented recessed cavity, and
   d) a plurality of threaded fasteners having sufficient length for attaching both the bracket body and a third brake light using existing holes within truck cab's third brake light socket.

3. The bracket adapted to mount accessories on a pick-up truck cab as recited in claim 2 wherein said unitary Z-shaped elongated body is formed of metal.

4. The bracket adapted to mount accessories on a pick-up truck cab as recited in claim 3 wherein said unitary Z-shaped elongated body is formed of cast aluminum.

5. The bracket adapted to mount accessories on a pick-up truck cab as recited in claim 4 wherein said Z-shaped elongated formed of cast aluminum is anodized.

6. The bracket adapted to mount accessories on a pick-up truck cab as recited in claim 4 wherein said Z-shaped elongated body formed of cast aluminum is painted.

7. The bracket adapted to mount accessories on a pick-up truck cab as recited in claim 2 wherein said forward upper horizontal mounting flange is spaced above the truck cab to clear accessory attaching fasteners.

8. The bracket adapted to mount accessories on a pick-up truck cab as recited in claim 2 wherein said forward upper horizontal mounting flange further comprising a plurality of accessory clearance openings compatible in size with accessory mounting attachments.

9. The bracket adapted to mount accessories on a pick-up truck cab as recited in claim 2 wherein said forward upper horizontal mounting flange has a thickness from 0.19 to 0.31 inches (0.48 to 0.079 cm).

10. The bracket adapted to mount accessories on a pick-up truck cab as recited in claim 2 wherein said upright section is curved vertically and horizontally to mate with the truck cab's external surface.

11. The bracket adapted to mount accessories on a pick-up truck cab as recited in claim 2 wherein said upright section having a plurality of clearance holes in the indented recessed cavity that are in direct alignment with existing threaded holes for original third brake light fasteners in the pick-up truck cab third brake light socket.

12. The bracket adapted to mount accessories on a pick-up truck cab as recited in claim 2 wherein said upright section having a bore for a grommet placed in the recessed cavity.

13. The bracket adapted to mount on a pick-up truck cab as recited in claim 2 wherein said rearward lower horizontal mounting flange having a plurality of clearance openings compatible in size with accessory mounting attachments.

14. The bracket adapted to mount accessories on a pick-up truck cab as recited in claim 2 wherein said rearward lower horizontal mounting flange has a thickness from 0.19 to 0.31 (0.48 to 0.79 cm).

15. The bracket adapted to mount accessories on a pick-up truck cab as recited in claim 2 wherein said bracket is configured to mount a plurality of utility accessories selected from the group consisting of driving lights, off-road lights, fog lights, strobe lights, cargo loading lights, LED accent lights, turn signal lights, backup lights, blinking caution lights, audio speakers, antennas and emergency vehicle lights.

16. The bracket adapted to mount accessories on a pick-up truck cab as recited in claim 2 wherein said bracket has a length of two-thirds of the width of the truck cab.

17. A method of mounting accessories on a pick-up truck cab having a third brake light socket comprising the steps of:
   a) partially removing a third brake light from the cab of the pick-up truck in order to expose the integral third brake light socket,
   b) disconnecting electrical wiring from the third brake light to complete removal,
   c) installing a bracket having a unitary Z-shaped elongated body and an indented recessed cavity into the cab's third brake light socket with the bracket fitting snugly,
   d) connecting electrical wiring from the truck to the third brake light,
   e) placing the pick-up truck third brake light into the indented recessed cavity of the bracket,
   f) installing a plurality of threaded fasteners having a length sufficient to attach both the bracket and the third brake light using existing holes within the truck cab's third brake light socket tightening the threaded fasteners until both the third brake light and bracket are secure, and
   g) installing accessories onto the bracket body.

* * * * *